Feb. 16, 1943. J. G. GORDON ET AL 2,311,169
HOP PICKING AND CLEANING MACHINE
Filed Dec. 30, 1940 2 Sheets-Sheet 1
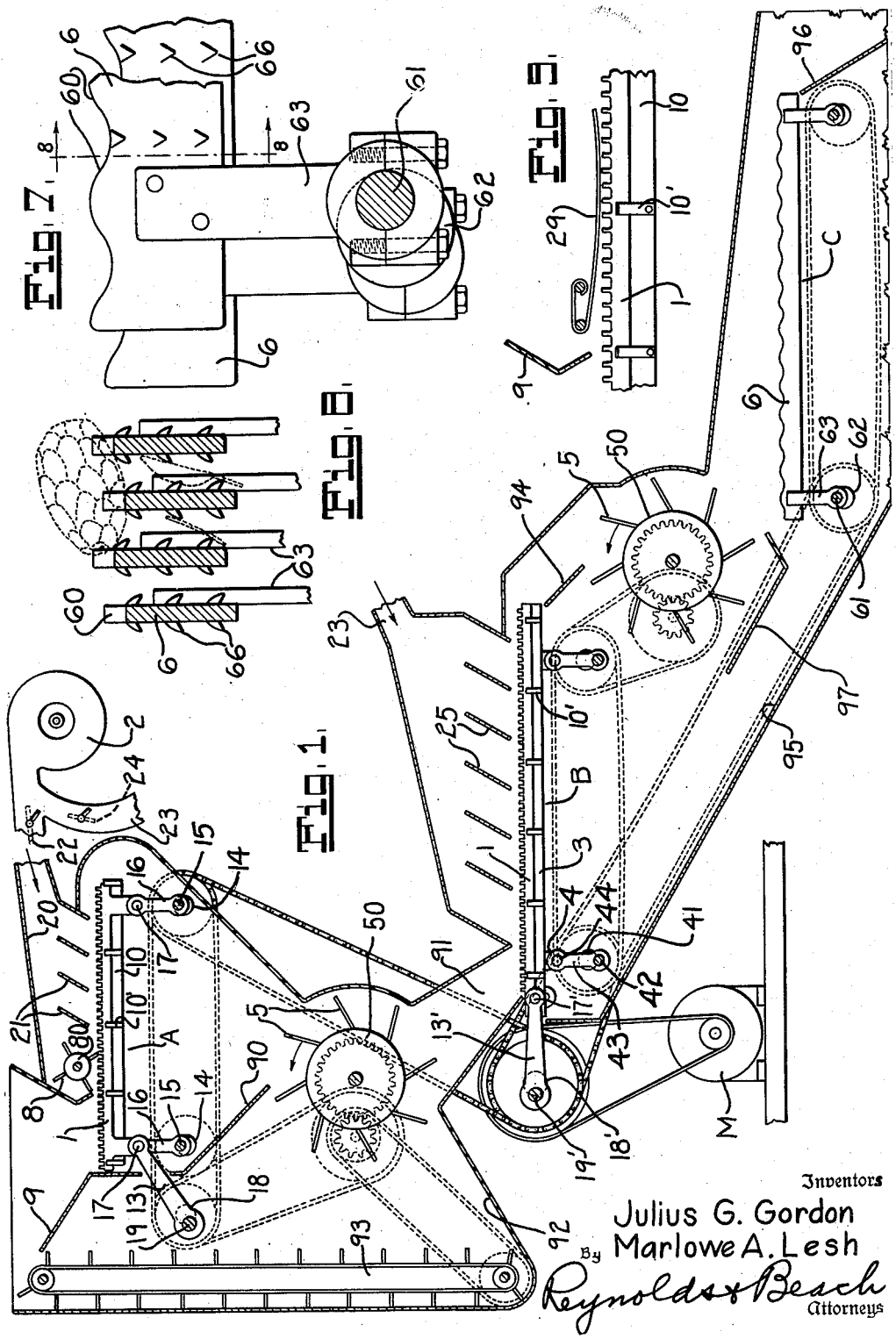
Inventors
Julius G. Gordon
Marlowe A. Lesh
By Reynolds & Beach
Attorneys Feb. 16, 1943.    J. G. GORDON ET AL    2,311,169
HOP PICKING AND CLEANING MACHINE
Filed Dec. 30, 1940    2 Sheets-Sheet 2
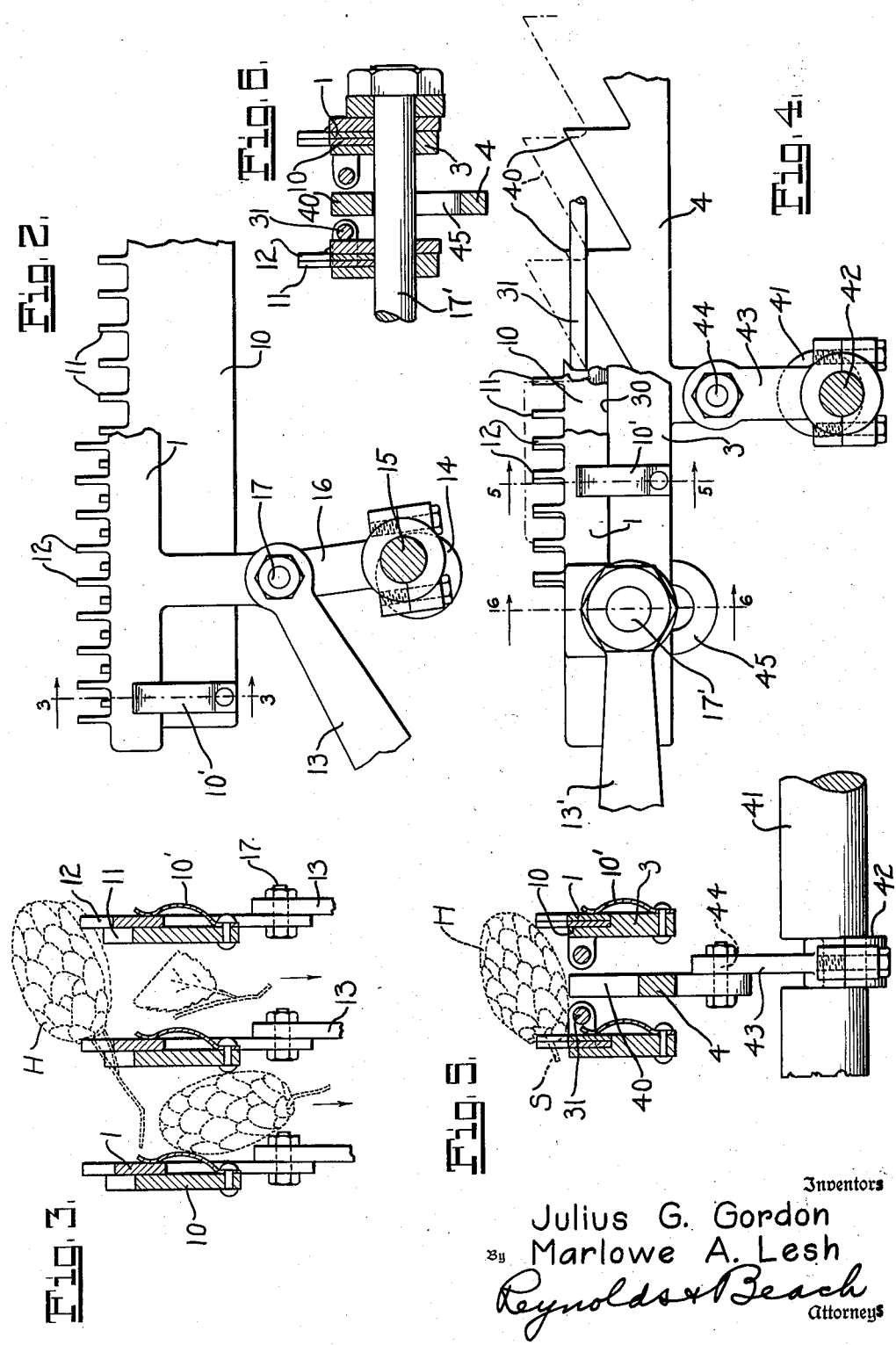
Inventors
Julius G. Gordon
Marlowe A. Lesh
By Reynolds & Beach
Attorneys Patented Feb. 16, 1943

2,311,169

UNITED STATES PATENT OFFICE 2,311,169

HOP PICKING AND CLEANING MACHINE

Julius G. Gordon, Yakima, and Marlowe A. Lesh, near Yakima, Wash., assignors to Washington State Hop Producers, Inc., Yakima, Wash., a corporation of Washington Application December 30, 1940, Serial No. 372,254

35 Claims. (Cl. 130—30)

The picking and cleaning of hops is an economic problem which is complicated by the desires of the users. The users desire hops cleanly picked, that is, with no stems or, at most, but few stems, of minimum length; not bruised (that is, with petals crushed); and not shattered (that is, with petals knocked off); with a minimum of shattered petals loose in the hops; and with no loose pieces of vines or arms, stems, leaves, and like debris mixed in. The requirement that the hops have no stems or stems of minimum length, if satisfied by hand-picking methods, would require each individual hop to be handled and picked from its stem, and since they grow on long arms, and in rather large clusters, this would involve a large amount of hand labor, which, under economic conditions at present obtaining in this country, are impossible. On the other hand, mere stripping of the hops from the stems by hand will save time, but will result in a higher percentage of bruised and shattered hops, thereby entailing loss of substance, and will result also in a larger percentage of hops which have stems of varying lengths attached, thereby entailing loss by degrading of the hops. Such stripping also leaves in the hops large amounts of debris, the removal of which entails an economic loss and possible damage to the hops, and the inclusion of which degrades the hops.

Considerations such these have led to the employment of machines for picking hops or for cleaning hops, or both, but such machines, while greatly having in labor, and effecting a fairly satisfactory job of picking the hops, have resulted in largely increased losses through shattering and bruising, and as well have not entirely solved the problem of reducing the lengths of the stems to the minimum, nor of separating each individual hop from its cluster.

Former machines have been principally of two types. They are alike in that they do not handle nor treat individual hops, as such, but in that they deal only with vines, arms, or clusters, from which the hops (and such leaves and stems as are effected by the hop removing elements) are removed. One of these types incorporates wire screen belts of diamond mesh or the like, or equivalent devices, with means to grip the vines, and to produce relative movement, so that, the vines being held by the grippers and the clusters passing through and being caught in the notches of the diamond mesh, the hops are stripped from the vines. A second form involves the stripping action of two, or at least one, rotating roller in conjunction with another roller, between which the vines are drawn, the rotation of the roller or rollers serving to beat or strip the hops from the vines. The first such type produces a high percentage of shattered hops, and the second type involves a high percentage of bruised hops. Both of them involve the stripping of a large amount of leaves and stems, which in turn require further cleaning, and in none of them is there any practicable way of insuring that a high percentage of the stems are reduced to the very minimium in length, or are eliminated altogether.

Our invention is to be distinguished particularly from such devices as the above, in that there is no stripping action, nor forceful engagement of individual hops by the machine, but rather a shearing action, acting upon the vines, arms, and clusters, but not capable of acting upon the hops themselves. This shearing action, produced by presenting the hop-bearing vines, arms, clusters, etc., to pairs of multiple-toothed relatively reciprocable shearing blades, reduces vines, arms, stems, and clusters, as also the leaves, to progressively smaller pieces. Simultaneously, using the shearing blades as screens through which the hops can not pass, we can effect segregation of the debris thus formed from the hops. Finally the shearing blades may act upon the individual hops to sever even the short individual stems from the hops, and to remove these short stems, leaving finally only the uninjured individual hops, each with a very short stem or no stem at all, and free of all debris. The entire operation is automatic and continuous, and causes a minimum of loss, either by way of damage to the hops, or by way of degrading from excessive stem lengths or from inclusion of debris. In addition it reduces the cost of picking and cleaning to the minimum.

It will be clear from the above that we have produced a machine which operates upon a wholly new principle, and a method which is distinct from former methods. Our machine is not primarily a hop picker, nor primarily a hop cleaner, but necessarily partakes of the nature of each. It can therefore be designated a combined hop picking and cleaning machine; in this specification, however, as one such function or the other is emphasized, it may be termed a hop picking machine, or a hop cleaning machine, but either such term, if used alone, is intended to include the other, unless it is clear from the context that only the single function is intended.

The provision of a machine having the above capabilities, and organized and arranged to the above end, and the method which involves division and severance by shearing, are the principal objects of this invention. Especially is it an object to provide such a machine which will operate in a continuous process, so that the hops may be brought in from the field, delivered to the machine as vines, or as rough picked, and can be delivered continuously from the machine as clean, individual first-grade hops, with little or no attention during their passage through the machine.

It is likewise an object to provide such a machine which may be made sufficiently small and sufficiently cheaply that it is economically feasible to employ it on the smaller hop ranches, and to distribute the machines widespread throughout hop growing regions, to the end that all hops from a given region may be substantially uniform, and cooperative grading and marketing arrangements may be satisfactorily carried out.

More specific objects, and particularly such as relate to the individual parts and mechanism of the machine, will be understood better as this description progresses.

Our invention comprises the novel machine, the novel individual parts and mechanisms thereof, and the novel method, all as disclosed and claimed herein.

In the accompanying drawings our invention is illustrated largely in diagrammatic fashion, it being understood that various changes may be made in the form, character, and arrangement of the parts without departing from the scope and spirit of the invention, as defined in the claims.

Figure 1 is a diagrammatic showing, largely in side elevation, but with casing and chute parts shown in section, illustrating the essential parts of the entire machine, but omitting structural details such as supports and framework, for clearer illustration of the essentials of the invention.

Figure 2 is a side elevation of a detail of the rough shearing bank, which the hop clusters first encounter, and Figure 3 is a detail section therethrough, substantially on the line 3—3 of Figure 2.

Figure 4 is a side elevation of a detail, similar to Figure 2, but illustrating details of the finishing shearing bank, and Figures 5 and 6 are sections upon the respective lines 5—5 and 6—6 of Figure 4.

Figure 7 is a side elevation of a detail of the cleaning bank, and Figure 8 is a cross section therethrough substantially on the line 8—8 of Figure 7.

Figure 9 is a detail in side elevation of the first shearing bank, showing a modified form of construction of an associated device.

In essence the machine comprises at least one, preferably two, banks of toothed shear blades, represented by the first or roughing bank A in Figure 1, and the second or finishing bank B. Each of these banks may be described as comprising pairs of shearing blades disposed in contact one with the other, in vertical planes, but disposed generally parallel to other such pairs, and the whole making up a generally horizontal (or inclined) flat table, whereupon materials may rest. The spacing of these pairs of blades apart, with relation to the smallest dimensions of the hops which are being processed, is an important element in the invention, and will be discussed more particularly as each bank is described in detail. The spacing of the teeth of each shear blade is likewise important, and will be discussed later. In each bank means are provided to effect relative reciprocation of the blades of each pair. Normally one blade is fixed and the other is reciprocated by suitable means. The nature of the reciprocatory motion given to the blades varies in the two banks, and will be discussed as each bank is described.

Means are provided to advance the hops along each bank, the hops being fed to the bank at one end and discharged, if not sooner, by passing over the opposite end. The feeding or advancing arrangement might be anything which is found suitable, but preferably is effected by a rising, then a longitudinal, and then a dropping movement of either one of the blades of each pair, or by a separate serrated feed bar, operating in a similar and known manner.

Means are provided along the path of the hops to segregate the debris from the hops, to rerun the debris, if desired, in order that hops may not be lost which accidentally are segregated with the debris, or which pass through the final bank without separation from their clusters, and finally to agitate the hops to separate them from any possibly remaining or adhering debris, and in a cleaning bank to positively remove the debris, such as leaves, which may tend to cling to the hops.

In the earlier stages of the operation, in order to insure that the vines, arms and/or stems will be pressed downwardly, despite their inherent springiness, into engagement between the teeth of the shearing blades, provision is made for exerting a yieldable force urging the supported mass downwardly against or into the shearing blades. This may consist of a gentle blast of air directed downwardly above the hop clusters or vines. Likewise, to break up somewhat compacted clusters, and to segregate one cluster from another after initial delivery to the machine, means may be provided for spreading the mass as it is advanced, so that it thinly covers each bank, and thereby the stems more effectively brought into operative relationship with the shearing blades.

The hopper 9 receives the hops from the pickers' sacks, and guides them to the first shearing bank A. This bank, shown in detail in Figures 2 and 3, includes fixed bars 10 and reciprocatory bars 1, arranged in pairs, which are spaced apart, as shown in Figure 3, sufficiently that individual hops will pass downward between them, but spaced insufficiently to permit a cluster of any appreciable size to pass through. This spacing may vary as the normal size of the hops of a given district varies. These bars are arranged generally horizontally in vertical planes, and the upper edge of each blade is toothed, as is clearly seen in Figure 2, to provide the cooperating teeth 11 and 12, which by their reciprocatory motion, the teeth 12 past the teeth 11, effect shearing severance of such stems and vines as find their way between these teeth. Preferably, however, the reciprocatory blades 1 have an additional function, namely, feeding the hop clusters along the bank, and to accomplish this end the blades 1 not only reciprocate lengthwise of the bars 10, but also move vertically with respect to the bars 10, and thus combine vertical and longitudinal components to effect movement in a closed path of generally circular or oval form. The vertical component of the motion also assists in engaging the vines, and in drawing them between the cooperating teeth, for severance. Springs 10', carried by the blades 10 and pressing against the sides of the blades 1, permit this combination of movements, and these movements are conveniently effected by a combination of eccentrics or cranks.

A transverse shaft 14 is formed with cranks or eccentrics joined by connecting rods 16 to the blades 1 or to extensions therefrom at 17. This produces primarily the vertical component of the bodily movement of the blades 1. A second transverse shaft 18 has a crank 19 which connects by a connecting rod 13 to the pin at 17. By the crank 19 the blade 1 is given primarily its longitudinal component of movement. Preferably the crank throw at 19 is greater than the crank throw at 15, approximately twice as great in the form shown, and the crank throw at 19 is in excess of the spacing between any two teeth 11 or 12. Accordingly, by proper combination of the crank throws of the cranks 15 and 19, the blade 1 is given a bodily movement first primarily upwardly, then primarily forwardly, then downwardly, and finally rearwardly to the point of starting. While the blade 1 is upraised and advancing forwardly, it advances also the hop vines or clusters which rest upon it, and as it drops downwardly the stem portions settle between the teeth, being so urged by the downward air movement referred to above, and then as the blades 12 move rearwardly they sever the stems which are between them and the teeth 11. It should be noted that the shaft 14, crank 15, and connecting rod 16 are duplicated at the opposite end of the bank, and the two cranks are coordinated and timed to move simultaneously.

Since the clusters, the vines, and the stems are somewhat resilient, and therefore may not tend readily to drop into the spaces between the teeth in the bank A, means, as already mentioned, are preferably provided to insure that they are yieldingly urged downwardly into such engagement. Physical means may be provided to this end, and a spring leaf 29 is shown for such a purpose in Figure 9. Preferably, however, the means used is impositive, that is, we have found that a downwardly directed current of air is most suitable to this end. We have illustrated a blower 2 delivering to a conduit 20 and through louvers 21 to this end. The current of air may be controlled or regulated by a suitable damper 22, if desired.

We have shown means at 8, in the nature of pins projecting radially from a rotative drum 80, and interspersed between the pairs of blades, for the purpose of separating the clusters and vines as they advance along the bank A, and of distributing them with reasonable thinness over the bank. The drum might be driven for rotation, or merely left free to be rotated by the passing clusters. The leaf springs 29 in Figure 9 would have the effect of separating the clusters, also. Any suitable means to this end may be employed, and in some instances it may not be necessary or desirable to employ any agency for this purpose. Its use is therefore optional.

The finishing shearing bank B is in many respects similar to the bank A. It is shown in detail in Figures 4, 5, and 6. It involves a fixed blade 10, and a reciprocatory blade 1, as before, although in this instance, since the blade 1 is merely reciprocatory longitudinally, and its movement preferably has no vertical component, it may rest upon and be guided by a ledge 30 in the supporting bar 3. Reciprocation of the blade 1 is accomplished, as before, by a crank 19' upon the shaft 18', acting through a connecting rod 13' connected to the blade at 17'.

In the bank B the pairs of blades 1 and 10 may be sufficiently widely spaced to permit individual hops to pass through between them, or they may be less widely spaced. If they are thus widely spaced, however, provision is made for closing in the intervening space, to the end that, in all instances, individual hops of normal size are prevented from passing through between adjacent pairs of blades; this is contrary to the arrangement in bank A. To this end rails 31 may be supported from the bars 3 and within the space between these bars, to help fill in the space without entirely closing it, for it is intended that pieces of stems, leaves, and other debris shall pass through between the bars and pairs of rails, to be thereby segregated from the hops, which stay on top.

In addition it is preferred that special means be employed to advance the hops along this bank, and to tumble them about. These advancing or feeding means may well be located between the pairs of rails, thus to assist in closing in this space. To this end serrated feed bars 4, having the serrations 40 defining forwardly directed shoulders, are located as described, and are movable in a manner resembling the movement of the bars 1 of the bank A, namely, in a path which includes both vertical and longitudinal components. To this end a shaft 41 is provided with a crank or eccentric 42, which is connected through a connecting rod 43 to the bars 4 at 44. Likewise the pin 17', which extends transversely of the bank to engage each of the bars 1, passes through a vertical loop 45 in each of the bars 4, and thereby effects reciprocation of the serrated bar 4 in timed relation with the reciprocation of the shear blade 1. At the same time, in advance of appreciable forward movement, the crank 42 causes the serrations 40 to be raised above the level of the tops of the teeth 11 and 12. The result is the individual hops are lifted and tumbled about, and advanced, and by this tumbling about their short stems S, as seen in Figure 5, are presented between the teeth 11 and 12 to be severed by the reciprocation of the teeth 12 relative to the stationary teeth 11.

As in the bank A, it is preferred that means be provided for yieldingly or impositively holding the hops downwardly, or urging them towards the reciprocating blades, and this may well be accomplished by diverting a part of the output of the blower 2 through the conduit 23, past the controlling damper 24, and through the louvers 25, to direct this portion of the gentle air blast downwardly over the individual hops upon the tank B.

As has been stated before, the hops are delivered within the hopper 9 upon an end of the bank A, and as they pass along this bank the vines, arms, and stems are severed by the reciprocatory knives to divide the clusters into smaller clusters and into individual hops, and to reduce the vines and arms into progressively smaller pieces. The individual hops, as also the cut up lengths of vines, leaves, and the like, when reduced to sufficiently small pieces, fall through the spaces between the pairs of blades in the bank A, where they are caught by the chute 50. Likewise any that pass beyond the end of the bank A are caught in the same chute, and are delivered downwardly by gravity. The chute preferably directs all this material at one side only, that is, the upwardly moving side, of a transverse rotative drum 50 having a number of fingers 5 outstanding from it and directed more or less radially. Preferably they are somewhat inclined forwardly in the direction of rotation of the drum. They are spaced apart sufficiently that individual hops may pass between them, and, striking only the periphery of the drum, are permitted to pass on downwardly to the chute 91. Any stems of appreciable length, however, and most of the small clusters, are caught on the pins 5, as also are leaves, and these, by the inclination of the fingers 5, drop off at the opposite side of the drum, where they are received in the chute 92, to be discharged or to be elevated by the elevator 93 for redelivery into the hopper 9 and rerunning.

The material which passes into the chute 91, largely segregated individual hops, but with perhaps longer stems than desirable, as may be seen in Figure 3, are delivered by the chute 91 to the feed end of the bank B, and they now pass along this bank. Since the individual hops may not pass through between the blades of the bank, they are delivered over the end of this bank, and by way of the chute 94 are delivered past additional fingers 5 on a second drum 50, whereas the stems which are removed in the bank B, and any leaves which may have escaped previous segregation, are received beneath the bank in the chute 95, and thence delivered to waste. The fingers 5 at the end of the bank B segregate principally very small clusters, which are delivered to a chute 97, to be rerun.

Passing beyond the end of the bank B the hops are now substantially ready for delivery to the drier, but in order to insure that all debris which might tend to stick in the petals or upon the hops is removed, particularly leaves, it is preferred that the hops be passed over a cleaning bank C. This bank is shown in detail in Figures 7 and 8.

It consists of a series of parallel bars 6, generally horizontally arranged, though disposed in vertical planes, and scalloped along their upper edges. They are spaced apart insufficiently to permit a hop to pass between them, and consequently their scallops 60 act somewhat after the fashion of the serrations 40 in the bank B, to advance the individual hops and to tumble them as they advance, thereby loosening and segregating the debris from the hops. This movement of the bars 6 is accomplished by opposite-throw cranks 61 upon a shaft 62, rigidly joined to the bars 6 by the connecting links 63. So far as the hops are concerned, these bars 6 merely tumble the hops and advance them along step by step until they reach the chute 96, where they are discharged to be sent to the drier.

The leaves and stems, however, that are disengaged from the hops in the cleaning bank C may not readily drop through between the bars 6. To positively assist them, and to cause them to move through between the bars, we provide downwardly directed prongs 66 on the side faces of the several bars, which prongs, by the vertical movement of the bars, will engage leaves, stems, and the like, though they will not engage the hops, and will positively move these leaves downwardly from prong to prong until they drop free beneath the bank C, where they are received in the waste chute 95 or in an extension thereof.

A driving motor is shown at M, and various drive connections are illustrated, but it is not believed to be necessary to describe them in detail, especially since the direction of motion, where important, has been indicated by arrows.

By the arrangement described portions of hop-bearing vines, or rough picked hops in long arms or in large clusters are delivered to the machine. Because the individual hops are not touched by the picker they are not damaged, neither bruised nor shattered, when they reach the machine. This hop-bearing material is delivered to the rough shearing bank A, where the vine-like or stem-like matter is dissevered, and the individual hops H are largely severed from the clusters and drop through. Some debris, and the uncut small clusters, are segregated from them at 5, and they pass to the finishing shearing bank B, where they again pass along the bank and over its end, the debris falling through and being thereby segregated. In passing along the bank B the hops are merely tumbled about, but are never engaged positively, so that there can be no brushing or shattering action, nor is there in the bank A. Again segregation may be accomplished by the fingers 5, and finally the hops pass to the cleaning bank C, where again they are tumbled about, and segregation of debris occurs. In none of this is the hop injured in any way.

It is desired to point out that the spacing of the teeth 11 and 12 is such, with relation to the average dimensions of the hops being treated, that no appreciable portion of any hop can enter between any two adjacent teeth. With firm, ripe hops there is no part nor petal which materially projects from the body of the hop, and they are sufficiently solid, yet sufficiently resilient, that they resist any attempt, by the gentle forces acting upon them, to force them between any two such teeth. However, the stems which are attached to them, or the vines or arms which bear them, may readily enter between the teeth, and the opening between adjacent blades is sufficiently wide that in actual practice the stems may be sheared off practically at their junction with the body of the hop, particularly in the finishing bank B. It is true, of course, that hops are not all alike in size, neither from the same vines or as to the several varieties, but such a machine, if adapted to one size of hop, will reasonably well care for sizes which are somewhat different, and if necessary the machine may be designed to accommodate the particular variety and size of hops grown in the region where the machine is to be used.

What we claim as our invention is:

1. A machine of the character described comprising a plurality of bars disposed in generally parallel vertical planes to define collectively a grid for the support of a mass of hops and hop clusters, said bars having dentigerous upper edges, and being disposed in pairs in contiguous side-by-side relation, means to effect relative longitudinal reciprocation of such paired bars, for shearing, means to advance supported material over the grid, and means to segregate the leaves, stems, and like debris from the severed hops.

2. A machine of the character described comprising a plurality of bars disposed in generally parallel vertical planes to define collectively a grid for the support of a mass of hops and hop clusters, said bars having dentigerous upper edges, and being disposed in pairs in contiguous side-by-side relation, means to effect relative longitudinal reciprocation of such paired bars, for shearing, means to advance supported material lengthwise along the bars, and means to separate the leaves, stems, and like debris, and the severed hops.

3. A machine of the character described comprising a plurality of blades disposed in generally parallel vertical planes and to define collectively a grid for the support of a mass of hop clusters, and having dentigerous upper edges, said blades being further disposed in pairs, in contiguous side-by-side relation, and each such pair being spaced from adjacent pairs by more than the smallest dimension of a normal hop, and sufficiently to permit passage of debris and of severed hops downward between them, but by less than the greatest dimension of such normal hop, means to effect relative longitudinal reciprocation of the blades of each pair, for severance of individual hops or smaller clusters from larger clusters upon the grid, and means to segregate the debris from the hops.

4. A machine of the character described comprising a plurality of bars having dentigerous upper edges and disposed in generally parallel vertical planes and to define collectively a grid for the support of a mass of hops and hop clusters, certain of said bars being further disposed in pairs, in contiguous side-by-side relation, the spacing between adjacent bars being insufficient to permit hops of normal size to pass therebetween, but sufficient to permit debris to drop through, means to advance hops and hop clusters over the grid, and means to effect relative longitudinal reciprocation of the paired bars, to shear the stems and progressively to divide the clusters into smaller clusters and individual hops.

5. A hop picking machine comprising a plurality of bars disposed in generally parallel planes to define collectively a grid for the support of a mass of hop clusters, certain of said bars having dentigerous upper edges and being disposed in contiguous side-by-side relation to constitute a plurality of pairs of shear blades, means to distribute the hops thinly over the grid, means to effect relative longitudinal reciprocation of the paired blades, to sever the stems and progressively to reduce the clusters to smaller clusters and to individual hops.

6. A hop picking machine as in claim 5, including further, means to segregate the clusters one from another, preparatory to distributing them over the grid.

7. A hop picking machine comprising a plurality of bars disposed in generally parallel planes to define collectively a grid for the support of a mass of hop clusters, certain of said bars having dentigerous upper edges and being disposed in contiguous side-by-side relation to constitute a plurality of pairs of shear blades, means to effect relative longitudinal reciprocation of the paired blades, to sever the stems and progressively to reduce the clusters to smaller clusters and to individual hops, and means to impose a force upon the supported clusters to urge them downwardly, and thereby to engage their stems between the teeth of the reciprocatory blades.

8. A hop picking machine comprising a plurality of bars disposed in generally parallel planes to define collectively a grid for the support of a mass of hop clusters, certain of said bars having dentigerous upper edges and being disposed in contiguous side-by-side relation to constitute a plurality of pairs of shear blades, means to effect relative longitudinal reciprocation of the paired blades, to sever the stems and progressively to reduce the clusters to smaller clusters and to individual hops, means to impose a force upon the supported clusters to urge them downwardly, and thereby to engage their stems between the teeth of the reciprocatory blades, and means to advance the hop clusters along the grid, and to agitate them while advancing.

9. A hop picking machine as in claim 7, characterized in that the force imposing means, urging the clusters downwardly, is inherently of an impositive nature.

10. A hop picking machine as in claim 7, characterized in that the force imposing means, urging the clusters downwardly, includes means to direct an air current downwardly upon the hop clusters and towards the grid.

11. A machine of the character described comprising, in combination, a rough shear bank including a plurality of bars disposed in generally parallel vertical planes, and collectively defining a grid for supporting a mass of hop clusters, said bars having dentigerous upper edges disposed in pairs in contiguous relation, and by relative longitudinal reciprocation effecting a shearing of the stems, said pairs of bars being spaced sufficiently from adjacent pairs to permit individual hops to pass through, but retaining clusters and uncut vine material, a finishing shear bank similarly formed, but having its component parallel elements so closely spaced that individual hops can not pass therethrough, but debris may, means to effect relative longitudinal shearing reciprocation of the toothed bars in each bank, to reduce large clusters to smaller clusters or to individual hops in the rough bank, and to reduce the length of the individual stems in the finishing bank, and means to advance the hops along the finishing bank.

12. A machine as in claim 11, including means to tumble the hops as they advance along the finishing bank.

13. A machine as defined in claim 11, including means yieldingly urging the supported material downwardly towards the reciprocatory toothed bars, for engagement of their stems with the teeth thereof.

14. A machine of the character described comprising, in combination, a rough shear bank including a plurality of bars disposed in generally parallel vertical planes, and collectively defining a grid for supporting a mass of hop clusters, said bars having dentigerous upper edges disposed in pairs in contiguous relation, and by relative longitudinal reciprocation effecting a shearing of the stems, said pairs of bars being spaced sufficiently from adjacent pairs to permit individual hops to pass through, but retaining clusters and uncut vine material, a finishing shear bank similarly formed, but having its component parallel elements so closely spaced that individual hops can not pass therethrough, but debris may, means to effect relative longitudinal shearing reciprocation of the toothed bars in each bank, to reduce large clusters to smaller clusters or to individual hops in the rough bank, and to reduce the length of the individual stems in the finishing bank, means to advance the hops along the finishing bank, and means disposed to engage material passing from the rough bank to segregate the leaves, arms, clusters, and like debris, from the hops, and to permit principally individual hops to pass to the finishing bank.

15. A machine of the character described comprising a rough shear bank including a plurality of bars disposed in generally parallel vertical planes, and collectively defining a grid for the support of a mass of hop clusters, said bars having dentigerous upper edges disposed in pairs in contiguous relation, and by relative longitudinal reciprocation effecting a shearing of the stems, said pairs of bars being spaced sufficiently from adjacent pairs to permit individual hops to pass through, but retaining clusters and uncut vine material, a finishing shear bank similarly formed and with its components similarly spaced and arranged, associated longitudinally extending means narrowing the spaces between the pairs of bars of the finishing bank, but leaving space for passage of stems, and cooperating with the pairs of bars to support individual hops, and operable to tumble the hops, and means to effect relative longitudinal reciprocation of the shearing bars of each pair in both banks.

16. A machine of the character described comprising a rough shear bank including a plurality of bars disposed in generally parallel vertical planes, and collectively defining a grid for the support of a mass of hop clusters, said bars having dentigerous upper edges disposed in pairs in contiguous relation, and by relative longitudinal reciprocation effecting a shearing of the stems, said pairs of bars being spaced sufficiently from adjacent pairs to permit individual hops to pass through, but retaining clusters and uncut vine material, a finishing shear bank similarly formed and with its components similarly spaced and arranged, associated longitudinally extending means narrowing the spaces between the pairs of bars of the finishing bank, but leaving space for passage of stems, and cooperating with the pairs of bars to support individual hops, and operable to tumble the hops, means to effect relative reciprocation of the shearing bars of each pair in both banks, means to advance the hops along the finishing bank, a cleaning bank to receive the hops, including two sets of interspersed scalloped bars, disposed in generally vertical parallel planes, spaced by less than the smallest dimension of a normal hop, and collectively defining a hop-supporting grid, and means to reciprocate the two sets of bars relatively longitudinally and vertically, alternately, to advance the hops, and to free leaves and like debris therefrom, to drop between the bars.

17. In a machine of the character described, a grid to support a mass of hop material formed of a plurality of pairs of shear blades each multiple-toothed along its upper edge, and disposed contiguously in each pair, the pairs being spaced apart in parallel vertical planes, and means to effect relative longitudinal reciprocation of the blades of each pair, to sever the stems of hops in the material supported upon the grid.

18. In a machine of the character described, a grid to support a mass of hop material formed of a plurality of pairs of shear blades each multiple-toothed along its upper edge, and disposed contiguously in each pair, the pairs being spaced apart in parallel vertical planes, means to effect relative longitudinal reciprocation of the blades of each pair, to sever the stems of hops in the material supported upon the grid, and means yieldingly urging such material downward to engage the stems between the teeth of the shear blades.

19. In a machine of the character described, a grid to support a mass of hop material, formed of a plurality of pairs of shear blades each multiple-toothed along its upper edge, and disposed contiguously in each pair, the pairs being spaced apart in parallel vertical planes, means to effect relative longitudinal reciprocation of the blades of each pair, in a closed path which includes vertical and longitudinal components, to sever the stems of hops in the material supported upon the grid, and to advance the material thus supported.

20. A machine as in claim 17, the pairs of blades being spaced apart sufficiently to permit individual hops to pass through between them, but insufficiently to permit passage of clusters.

21. A machine as in claim 17, including means between the pairs of blades to reduce the free space to less than the smallest dimension of an individual hop, and means to advance individual hops lengthwise of the blades.

22. In a machine of the character described, a generally monoplanar grid to support a mass of hop material formed of a plurality of pairs of shear blades each multiple-toothed along its upper edge, and disposed contiguously in each pair, the blades being each disposed in parallel vertical planes, and the pairs being spaced apart, means to effect relative longitudinal reciprocation of the blades of each pair, to sever the stems which may enter between the teeth, means disposed between adjoining pairs of blades, and in the general plane of the grid, said means including serrated feed bars, cooperating with the blades to support individual hops upon the grid, and means to effect bodily reciprocatory movement of the feed bars in a path which includes longitudinal and vertical components, whereby to advance the hops along the grid, and to tumble them while advancing.

23. In a machine of the character described, a generally monoplanar grid to support a mass of hop material, formed of a plurality of pairs of shear blades each multiple-toothed along its upper edge, and disposed contiguously in each pair, the blades being each disposed in parallel vertical planes, and the pairs being spaced apart, means to effect relative longitudinal reciprocation of the blades of each pair, to sever the stems of hops which may enter between the teeth, means disposed between adjoining pairs of blades, and in the general plane of the grid, said means including serrated feed bars, cooperating with the blades to support individual hops upon the grid, means to effect bodily reciprocatory movement of the feed bars in a path which includes longitudinal and vertical components, whereby to advance the hops along the grid, and to tumble them while advancing, and means yieldingly urging the hops downwardly to engage their stems between the teeth of the shear blades.

24. In a machine of the character described, a generally monoplanar grid to support a mass of hops, formed of a plurality of bars each scalloped along its upper edge, spaced apart in parallel vertical planes, and connected in two sets, means to effect relative movement of the two sets, alternately, in closed paths which include vertical and longitudinal components, the spacing of the bars apart being insufficient to admit a normal hop between them, whereby such movement of the bars tumbles and advances hops supported thereupon, and downwardly directed prongs distributed over the vertical faces of the bars, to engage and draw downwardly leaves and the like, and to discharge them beneath the grid.

25. A machine of the character described comprising a plurality of bars having dentigerous upper edges and disposed in generally parallel vertical planes and to define collectively a grid, the spacing between adjacent bars being insufficient to permit hops of normal size to drop through, but certain adjacent bars being sufficiently spaced, at frequent intervals, to permit debris to drop through, means to reciprocate certain of said bars and simultaneously to move them upward and downward, to tumble and to advance hops supported upon the grid, certain of said bars being disposed in contiguous side-by-side relation, in pairs, and means to reciprocate said paired bars, to shear off stems from the hops.

26. A machine of the character described comprising a plurality of bars having dentigerous upper edges and disposed in generally parallel vertical planes and to define collectively a grid, the spacing between adjacent bars being insufficient to permit hops of normal size to drop through, but certain adjacent bars being sufficiently spaced, at frequent intervals, to permit debris to drop through, and means to reciprocate certain of said bars and simultaneously to move them upward and downward, to tumble and to advance hops supported upon the grid, certain of said relatively movable bars being disposed in contiguous side-by-side relation, in pairs, and by their reciprocation shearing off stems from the hops.

27. A machine of the character described comprising a plurality of bars disposed in generally parallel planes and defining collectively a grid for the support of a mass of hop clusters, each of said bars having a multiplicity of teeth along its upper edge spaced more closely than the smallest dimension of a normal hop, said bars being disposed in pairs in contiguous side-by-side relation, as shearing blades, and the pairs being spaced apart, and means to effect relative longitudinal reciprocation of such paired blades, to move matching teeth past one another, and thereby to sever the stems and to reduce the clusters to smaller clusters and individual hops.

28. A machine of the character described comprising a plurality of bars disposed in generally parallel planes and defining collectively a grid for the support of a mass of hop clusters, each of said bars having a multiplicity of teeth along its upper edge spaced more closely than the smallest dimension of a normal hop, said bars being disposed in pairs in contiguous side-by-side relation, as shearing blades, and the pairs being spaced apart, means to effect relative longitudinal rceiprocation of such paired blades, to move matching teeth past one another, and thereby to sever the stems and to reduce the clusters to smaller clusters and individual hops, and means to agitate the material supported upon the grid, for presentation of fresh stems to the shearing teeth.

29. A machine of the character described comprising a plurality of bars disposed in generally parallel planes and defining collectively a grid for the support of a mass of hop clusters, each of said bars having a multiplicity of teeth along its upper edge spaced more closely than the smallest dimension of a normal hop, said bars being disposed in pairs in contiguous side-by-side relation, as shearing blades, and the pairs being spaced apart, means to effect relative longitudinal reciprocation of such paired blades, to move matching teeth past one another, and thereby to sever the stems and to reduce the clusters to smaller clusters and individual hops, means to agitate the material supported upon the grid, for presentation of fresh stems to the shearing teeth, and means to urge the supported material downwardly to engage the stems with such teeth.

30. A machine of the character described comprising a plurality of bars disposed in generally parallel vertical planes and defining collectively a generally horizontal grid for the support of a mass of hop clusters, certain of the bars being paired in contiguous side-by-side engagement, and each having along its upper edge a multiplicity of teeth spaced more closely than the smallest dimension of a normal hop, the grid elements being spaced apart less than the smallest dimension of a normal hop, but sufficiently to permit debris to drop through, and means to effect relative longitudinal reciprocation of the paired blades, to move matching teeth past one another, and thereby to shear the stems and to reduce the clusters to smaller clusters and individual hops.

31. A machine of the character described comprising a plurality of bars disposed in generally parallel vertical planes and defining collectively a generally horizontal grid for the support of a mass of hop clusters, certain of the bars being paired in contiguous side-by-side engagement, and each having along its upper edge a multiplicity of teeth spaced more closely than the smallest dimension of a normal hop, the grid elements being spaced apart less than the smallest dimension of a normal hop, but sufficiently to permit debris to drop through, means to effect relative longitudinal reciprocation of the paired blades, to move matching teeth past one another, and thereby to shear the stems and to reduce the clusters to smaller clusters and individual hops, and means to advance the hops along the grid.

32. A method of picking hops which comprises progressively dividing the stems and vines by shearing into individual pieces smaller in one dimension than any dimension of a hop, and progressively removing the divided pieces from the undivided pieces of stem and vine and hops during said dividing operation and eventually severing the stems which hold the individual hops to the arm or cluster and separating said stems from the hops.

33. A method of picking hops from supporting arms or vines, which comprises the severance of debris, consisting of non-hop-bearing vines, arms, leaves, and stems, from hop-bearing material, and the reduction of the debris in size, as may be necessary, by progressive shearing of all such hop-bearing material and debris to reduce it to individual pieces of debris which are smaller in at least some one dimension than any dimension of a hop, and which are sufficiently small to pass between the bars of a grid, which bars are spaced less than any one dimension of a hop, and which method further comprises progressively separating such debris from hop-bearing material and from the hops by passing the individual pieces, during the shearing action and when they are reduced to such smaller size, between the bars of such grid.

34. A method of picking hops from supporting arms or vines, and of removing them from their individual stems, which comprises the severance of debris, consisting of non-hop-bearing vines, arms, leaves, and stems, from hop-bearing material, and the reduction of the debris in size, to the extent necessary, by progressive shearing of all such hop-bearing material and debris to reduce it to individual pieces which are smaller in at least some one dimension than any dimension of a hop, and which are sufficiently small to pass between the toothed and relatively reciprocable pairs of shear bars of a grid, which pairs, and the individual teeth of which bars, are spaced less than any one dimension of a hop, and which method further comprises progressively separating such debris from hop-bearing material and from the hops by passing the individual pieces, during the shearing action and when they have been reduced to such smaller size, between the bars of such grid, retaining the hop-bearing material and the whole hops until the latter are substantially free from all vines, arms, and leaves, and substantially free from attached stems.

35. A method of separating hops from their stems which comprises the tumbling of the hops by the relative reciprocation of the individual blades in a plurality of pairs of multiple toothed shear blades, arranged in a grid whereon a mass of hops rests, which pairs of blades, and the individual teeth whereof, are spaced less than any one dimension of a hop, by such tumbling eventually to present the stem of substantially every such hop between the cooperating shear teeth of a pair of blades, while the hops rest upon the grid, and which method comprises the severance of a stem so presented, by the reciprocation of the shear blade teeth, and the separation of the severed stems from the mass of hops, during such tumbling and substantially immediately upon such severance, by their passage between the blades of the grid.

JULIUS G. GORDON.
MARLOWE A. LESH.